United States Patent
Shin

(10) Patent No.: US 6,799,871 B2
(45) Date of Patent: Oct. 5, 2004

(54) LAMP MOUNTING STRUCTURE

(75) Inventor: Jong Hoon Shin, Kumi (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/333,018

(22) PCT Filed: Jul. 13, 2001

(86) PCT No.: PCT/KR01/01204

§ 371 (c)(1),
(2), (4) Date: Jan. 15, 2003

(87) PCT Pub. No.: WO02/08830

PCT Pub. Date: Jan. 31, 2002

(65) Prior Publication Data

US 2003/0151920 A1 Aug. 14, 2003

(30) Foreign Application Priority Data

Jul. 21, 2000 (KR) ........................................ 2000-41894

(51) Int. Cl.⁷ ............................ F21V 17/06; F21V 21/00
(52) U.S. Cl. ...................... 362/362; 362/368; 362/306; 362/350; 362/396
(58) Field of Search ................................ 362/306, 350, 362/396, 362, 368, 457, 458, 418, 226, 427, 428, 429, 430

(56) References Cited

U.S. PATENT DOCUMENTS

| | | | | |
|---|---|---|---|---|
| 4,385,345 A | * | 5/1983 | Freudenreich et al. | 362/549 |
| 4,388,679 A | * | 6/1983 | Blaisdell et al. | 362/306 |
| 4,430,696 A | * | 2/1984 | Lemcke | 362/306 |
| 4,482,942 A | * | 11/1984 | Blaisdell et al. | 362/293 |
| 5,101,236 A | | 3/1992 | Nelson et al. | 355/229 |
| 5,215,371 A | * | 6/1993 | Pileski | 362/306 |
| 6,280,036 B1 | | 8/2001 | Suzuki | 353/31 |
| 6,461,025 B1 | * | 10/2002 | Payne | 362/374 |

* cited by examiner

Primary Examiner—Laura K. Tso
(74) Attorney, Agent, or Firm—Fleshner & Kim, LLP

(57) ABSTRACT

Disclosed is a mounting structure for a lamp comprising a lamp having a funnel, a frame attached to a front end of the funnel and a connecting bolt provided at a rear portion of the funnel a lamp holder, which is adapted to hold the lamp therein while maintaining a desired lateral gap at each of the frame of the lamp, have a bottom plate, a front plate and a pair of side plates. The lamp mounting structure maintains an alignment of the optical axis of the lamp while effectively preventing the lamp from being damaged due to a thermal expansion thereof.

27 Claims, 4 Drawing Sheets

LAMP MOUNTING STRUCTURE

BACKGROUND OF THE INVENTION

1. Field of the Invention

The present invention relates to a lamp mounting structure. More particularly to a lamp mounting structure capable of aligning the optical axis of a lamp correctly while preventing a lamp from being damaged even when it is overheated. Thereby, the invention enhances the stability in the operation of the lamp and improve convenience in association with the use of the lamp. In particular, the present invention can be effectively employed to the cases in which the alignment of the optical axis of a lamp is important, such as the lamp mounting structures of projectors.

2. Background of the Related Art

Generally, a display device using a projection system includes a projector for projecting the light retaining an image signal, and a screen for reflecting the light projected from the projector, thereby displaying an image. The projector mainly includes a lamp for performing a light emitting function, a plurality of dichroic mirrors for reflecting or transmitting the light (white light) emitted from the lamp selectively, a liquid crystal panel for receiving the light beams separated from the light by the dichroic mirrors, thereby forming an image while controlling the amount of the light incident on each pixel thereof, and projection lens for projecting the image formed by the liquid crystal panel while enlarging the image.

The lamp is an essential component of the projector since it determines the basic performance of the projector such as controlling the brightness and color of the image projected onto the screen. FIGS. 1 and 2 illustrate an embodiment of a conventional lamp. Referring to FIGS. 1 and 2, the lamp 10 includes a funnel 12 serving as a mirror, a frame 14 attached to the front end of the funnel 12, an iron core 16 arranged at the rear portion of the funnel 12, a neck 18 adapted to partially surround the iron core 16, and a connecting bolt 19 protruded from the iron core 16. Metal material such as iron could be used to make the iron core 16. The iron core 16 is mounted on the neck 18 by a gypsum material interposed therebetween.

The brightness and the color of the image displayed by the projector vary greatly, depending on the direction of the light emitted from the lamp 10. Accordingly, it is necessary to firmly maintain the mounted state of the lamp 10. To this end, the lamp 10 is firmly and accurately mounted by a lamp holder 20 in order to prevent the optical axis of the lamp 10 from being miss-aligned in lateral, vertical and logitudina directions, the directions of X, Y, and Z axis in FIG. 1, respectively.

The lamp holder 20, which serves as a mounting structure of the lamp 10, has a bottom plate 201, a front plate 202, and a pair of side plates 203. The guide plates 22 are placed at both sides of the front plate 202 to fasten the right and the left sides of the frame 14 to the lamp holder 20. Vertically-extending guide plates 22 are provided at both sides of the rear surface of the front plate 202. The guide plates 22 serves to the frame 14 of the lamp 10, thereby holding the lamp 10 in the longitudinal, z-axid, and lateral, x-axis, directions. The lamp holder 20 also has a strip-shaped holding plate 30 mounted between the side plates 203 to hold the lamp 10 in the vertical, y-axis, direction. Both ends of the holding plate 30 are fitted in slots 203, which are formed at the side plates 203, respectively.

In the conventional lamp mounting structure having the above mentioned configuration, movements of the lamp 10 in lateral, x-axis directions are restricted by the guide plates of the lamp holder 20, and movements of the lamp 10 in vertical, y-axis, directions are restricted by the holding plate 30. Also, movements of the lamp 10 in longitudinal, z-axis, directions are restricted by the front plate 202 of the lamp holder 20 and stoppers that are provided at the lower end of the guide plates 22. Thus, the movements of the lamp 10 are restricted to prevent the optical axis of the lamp 10 from miss-alignments in any direction.

Meanwhile, heat generated as a result of a high temperature, for example, about 300° C. or above, at the lamp 10 isdue to the operations of the lamp 10. This heat serves to over-heat the lamp 10, thereby causing the funnel 12 and the frame 14 to expand. When the funnel 12 and frame 14 expand, an excessive pressure is applied to the funnel 12 by the lamp holder 20. Since the lamp 10 is placed in between the guide plates 22 of the lamp holder 20, the expansion may result in a crack, either at the funnel 12 or the neck 18.

If the width L2, the defined space between the guide plates 22, increases in order to prevent the lamp 10 from being damaged due to a thermal expansion as described above, then the lamp 10 may move laterally resulting in a miss-alignment of the optical axis a normal state. Also, there may be a degraded uniformity of the image displayed on the screen. In particular, the miss-alignment of the optical axis causes the displayed image on the screen to undesirably exhibit undersirable excessive yellow color at the periphery thereof.

SUMMARY OF THE INVENTION

Therefore, the present invention has been made in view of the above mentioned problems. An object of the invention is to provide a lamp mounting structure for a projector which is capable of maintaining a desired alignment of the optical axis of a lamp included in the projector while allowing the lamp to move freely to an certian extent. Thereby the invention will be able to prevent the lamp from being cracked due to an expansion caused by an excessive heat, thus achieving an improved stability in the operation of the lamp.

In accordance with the present invention, the object is accomplished by providing a mounting structure for a lamp comprising: a lamp having a funnel, a frame attached to a front end of the funnel, and a connecting bolt provided at a rear portion of the funnel; a lamp holder, which is adapted to hold the lamp therein while maintaining a desired lateral gap at each side of the frame of the lamp, has a bottom plate, a front plate and a pair of side plates; and a guide that elastically supports the lamp in position comprises hinges formed at the opposite ends of the guide and mounted on the bottom plate of the lamp holder in a manner that allows the hinges to rotate, an engagement member arranged at an intermediate portion of the guide and placed at an upper end of the front plate of the lamp holder and a contact member that is formed at the opposite sides of the engagement member and comes in contact with the lamp.

The lamp mounting structure according to the present invention allows the lamp to be enlarged and shifted to a certain extent with the structure of the lamp holder. Therefore, this structure prevents either the funnel or the neck of the lamp from being cracked even when the lamp is heated. Accordingly, it is possible to lengthen the life of the product to which the lamp mounting structure is employed.

In addition, the lamp mounting structure elastically holds the lamp using the structure of the tension guide. Accordingly, when the optical axis of the lamp is miss-aligned due to a shift of the lamp, this miss-alignment is immediately corrected. Thus, there is an advantage in that an improved stability in the operation of the product, for example, a projector, is achieved.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Figure 1:
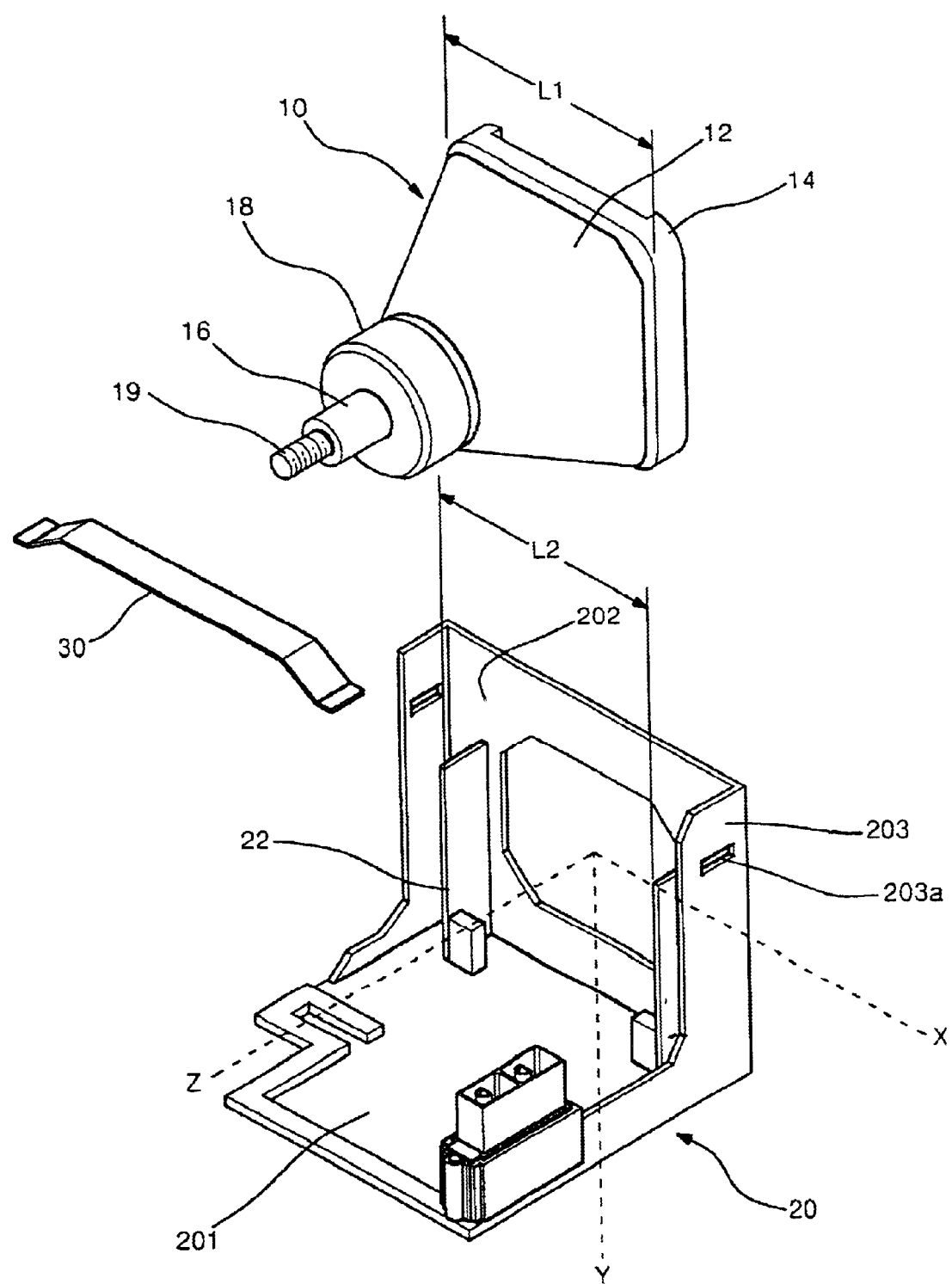
FIG. 1 is an exploded perspective view illustrating a conventional lamp mounting structure.
Figure 2:
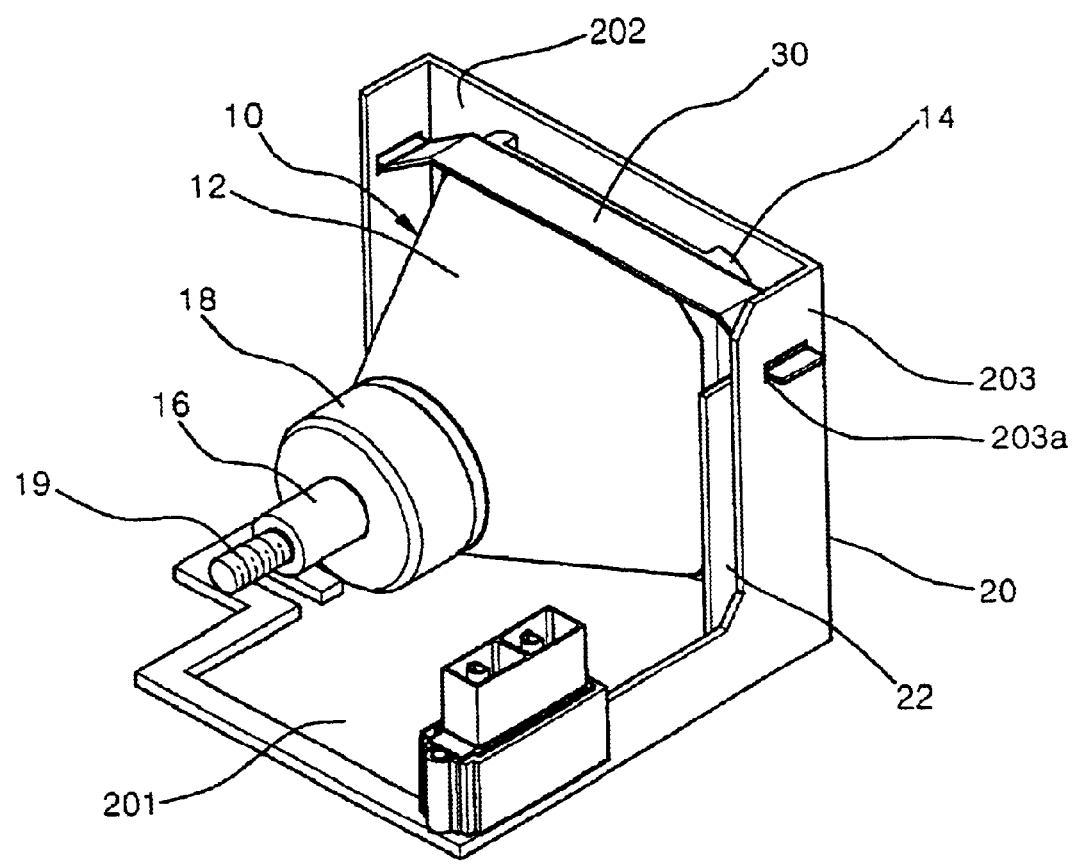
FIG. 2 is an assembled perspective view illustrating the conventional lamp mounting structure.
Figure 3:
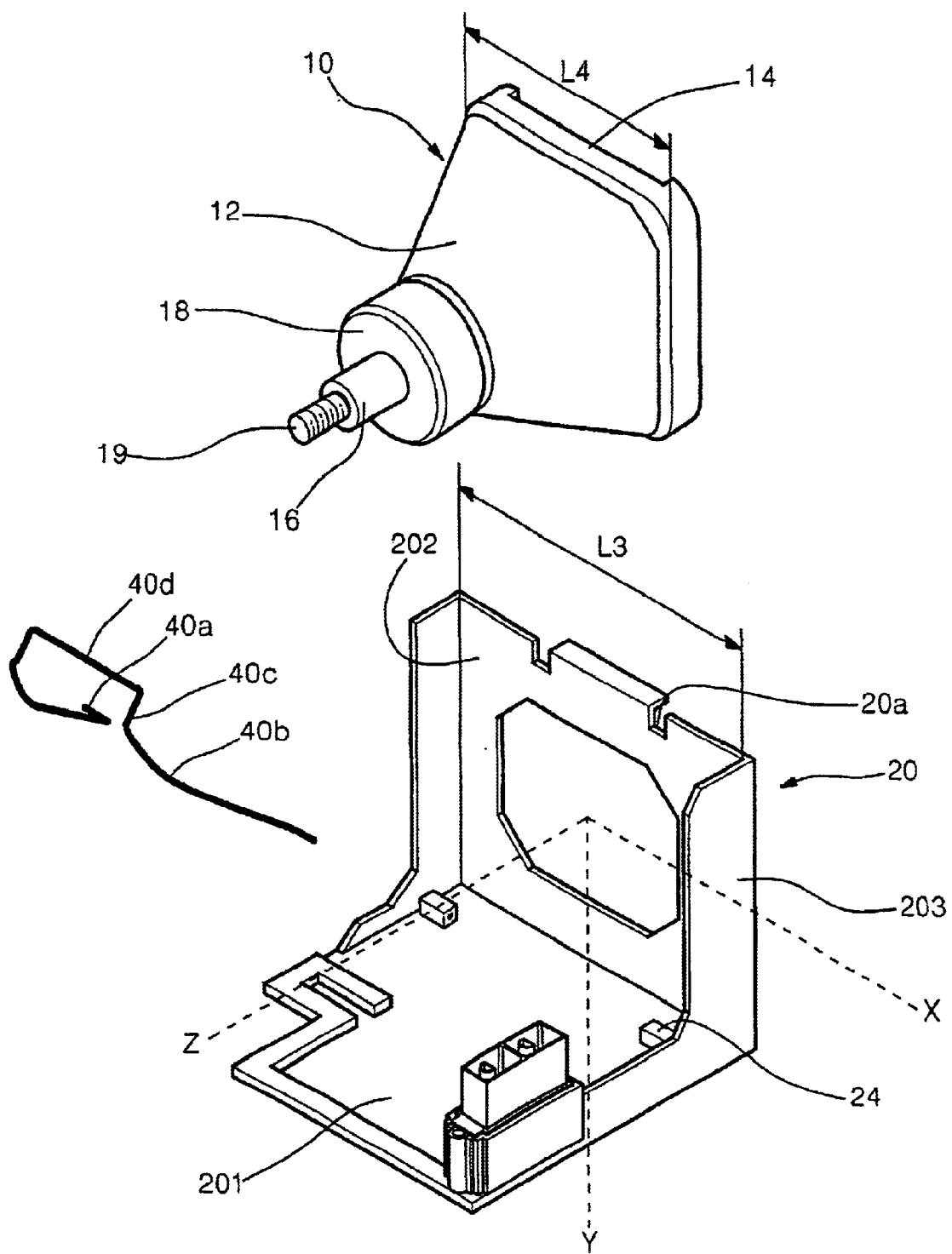
FIG. 3 is an exploded perspective view illustrating a lamp mounting structure according to an embodiment of the present invention.
Figure 4:
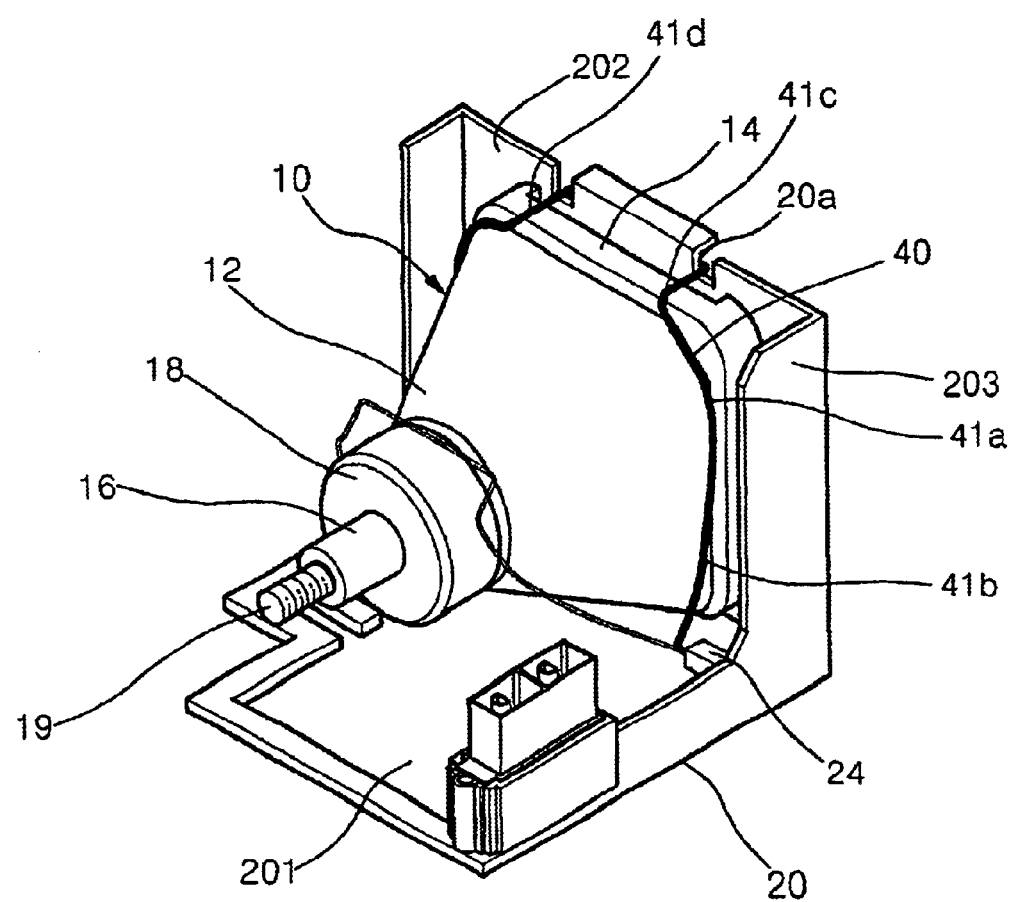
FIG. 4 is an assembled perspective view illustrating a lamp mounting structure according to the embodiment of the present invention

Now, preferred embodiments of the present invention will be described in accordance with FIGS. 3 and 4. In FIGS. 3 and 4, elements corresponding to those in FIGS. 1 and 2 are denoted by the same reference numerals.

In FIG. 3, a lamp mounting structure for a projector according to an embodiment of the present invention is illustrated. The lamp mounting structure includes a lamp holder 20 for holding a lamp 10, and a return means for elastically returning the lamp 10 to an original position. By using the return means, the optical axis of the lamp 10 is aligned in all directions, when the lamp 10 moves away from the original position.

As mentioned above, the lamp 10 includes a funnel 12, and a frame 14 provided at the front end of the funnel 12. Basically, the lamp holder 20 has a bottom plate 201, a front plate 202, and a pair of spaced side plates 203. In accordance with the present invention, the distance L3 between the side plates 203 of the lamp holder 20 is slightly longer than the lateral length Lt of the frame 14 by about 1 mm. That is, the lamp holder 20 is structured to support the lamp 10 while maintaining a desired gap between the frame 14 and the side plate 203.

The return means comprises a tension guide 40 having a curved structure to surround the side and upper surfaces of the funnel 12. The tension guide 40 is hingably mounted to the bottom plate 201 of the lamp holder 20 at both ends thereof. The tension guide 40 also has an intermediate portion engaged with the front plate 202, and the funnel and frame contact portions that are arranged at the opposite sides of the intermediate portion and are adapted to come into contact with the funnel 12 and frame 14 of the lamp 10. The tension guide 40 may be a wire member, which is able to be bent to have a desired shape. This tension guide 40 has material and structural characteristics capable of exhibiting a desired elasticity.

The shape of the tension guide 40 will be described in detail. The tension guide 40 has a wire-shaped guide body, hinges 40a respectively provided at the opposite ends of the guide body and mounted hingably to fixed members 24 mounted on the bottom plate 201, a funnel contact portions 40b extending from respective hinges 40a and serving to come into contact with the funnel 12, a frame contact portions 40c extending from the respective funnel contact portions 40b and serving to come into contact with the frame 14, and an engagement portion 40d provided at the intermediate portion of the guide body and engaged with engagement grooves 20a formed at the upper end of the front plate 202.

The tension guide 40 is mounted hingably to the bottom plate 201 using its hinges 40a mounted hingably to the fixed members 24. Once the lamp 10 is arranged in position in the lamp holder 20, the tension guide 40 is moved to engage its engagement portion 40d with the engagement grooves 20a formed at the upper end of the front plate 202. Thus, the lamp 10 is firmly held in the lamp holder 20 by the tension guide 40.

Four contacts 41 are formed between the lamp 10 and the tension guide 40 to define the position of the lamp 10 in the lamp holder 20.

The principle of positioning the lamp 10 by the tension guide 40 will be described hereinafter.

As shown in FIG. 4, contacts 41, a first contact 41a and a second contact 41b, are formed at each side of the lamp 10 between the funnel 12 and an associated funnel contact portions 40b. In FIG. 4, the tension guide 40 applies a force to the lamp 10 in leftward, rearward, and downward directions at the first contact 41a, while applying a force to the lamp 10 in left, rearward, and upward directions at the second contact 41b. Although not shown, the force of the tension guide 40 is applied to the left side of the lamp 10 in symmetrical directions to the force applied to the right side of the lamp 10.

The forces applied to the lamp 10 by the tension guide 40 are symmetric in a vertical, y-axis, direction and a lateral, x-axis, direction, so that they are offset by each other. Also, the force of the tension guide 40 in a longitudinal, z-axis, direction is applied to the front plate 202. Thus, the lamp 10 is firmly held in the lamp holder 20 in a state in which the forces applied to the lamp 10 by the tension guide 40 are balanced. When the force's balance is lost due to a positional shift of the lamp 10, a return force from the tension guide 40 is applied to the lamp at the contacts 41. With the return force, the lamp 10 is immediately moved to its original position where the optical axis of the lamp 10 is aligned in all directions. Thus, a desired alignment of the optical axis of the lamp 10 can be easily achieved.

The tension guide 40 may be structured to form additional contacts 41c and 41d where the frame contact portions 40c come into contact with the upper surface of the frame 14. In this case, a force from the tension guide 40 is applied downward to the frame 14 against the bottom plate 201. With this force, the lamp 10 can be held more firmly in the vertical direction.

In accordance with the lamp mounting structure having the above mentioned configuration, the lamp 10 is laterally movable to some extent in which the frame 14 of the lamp 10 is in contact with the front plate 202 of the lamp holder 20. Accordingly, even when the funnel 12 and frame 14 are deformed to have an enlarged size or are shifted due to the heat generation during the operation of the lamp 10, such phenomenon is absorbed by the tension guide 40 using the elasticity of the tension guide 40. Accordingly, there will be no crack in either the funnel 12 or hte neck 18.

In particular, when the lamp 10 is shifted resulting in a miss-alignment of the optical axis thereof, the tension guide 40 applies an elastic pressure to the lamp 10 in a direction opposite to the shift direction of the lamp 10. Also, its structure surrounds the left and right side surfaces and upper surface of the funnel 12. Accordingly, the position of the lamp 10 is immediately corrected. Thus, the optical axis of the lamp 10 is maintained in lateral, vertical and longitudinal directions, X, Y, and Z-axis directions, respectively.

The lamp mounting structure according to the present invention allows the lamp to be enlarged and shifted to a some extent having the structure including the lamp holder preventing the funnel or the neck of a lamp from being cracked even when the lamp is heated. Accordingly, it is possible to lengthen the life of the product to which the lamp mounting structure is applied. In addition, the lamp mounting structure holds the lamp elastically with the structure of the tension guide. Accordingly, when the optical axis of the lamp is mis-aligned due to a shift of the lamp, this mis-alignment is immediately corrected. Therefore, the improved stability in the operation of the product, for example, a projector, is achieved.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A mounting structure for a lamp comprising:
    a lamp having a funnel, a frame attached to a front end of the funnel and a connecting bolt provided at a rear portion of the funnel;
    a lamp holder, which is adapted to hold the lamp therein while maintaining a desired lateral gap at each side of the frame of the lamp, have a bottom plate, a front plate and a pair of side plates; and
    a guide that elastically support the lamp in position comprises hinges formed at the opposite ends of the guide and mounted on the bottom plate of the lamp holder in a manner that allows the hinges to rotate, an engagement member arranged at an intermediate portion of the guide and placed at an upper end of the front plate of the lamp holder and a contact member formed at the opposite sides of the engagement member and comes in contact with the lamp.

2. The mounting structure according to claim 1, further comprising
    fixed members mounted on the bottom plate of the lamp holder to allow the both ends of the guide to be attached with a capability to rotate.

3. The mounting structure according to claim 1, wherein the contact members are arranged at opposite side portions of the funnel, respectively, so that each of them forms at least two contact points with one of the side portions of the funnel and applies an elastic force to the funnel via the contact points, thereby maintaining the lamp, in an elastic fashion, at a position where an optical axis of the lamp is aligned in all directions.

4. The mounting structure according to claim 1, wherein the guide is a shaped metal wire having an elasticity.

5. The mounting structure according to claim 1, wherein the guide further has additional contact members that extend from opposite ends of the engagement member and apply a force to the frame of the lamp in a downward direction, thereby causing the lamp to be firmly held in a vertical direction.

6. The mounting structure according to claim 1, further comprising:
    engagement grooves formed at the upper end of the front plate of the lamp holder such that the engagement member of the guide may be placed in effective position.

7. A structure for mounting a lamp of a projector comprising:
    a lamp having a funnel, a frame attached to a front end of the funnel, and a connecting bolt provided at a rear portion of the funnel;
    a lamp holder that adapted to hold the lamp includes a pair of side plates arranged at opposite sides of the frame of the lamp while maintaining a desired lateral gap from an associated one of the opposite sides of the frame, a front plate being in contact with a front surface of the frame while applying a force to the lamp in a direction toward the lamp, and a bottom plate being in contact with a bottom surface of the frame and supporting the frame in a downward direction; and
    a tension guide that adapted to elastically support the lamp in position includes the hinges provided at opposite ends of the guide and hingably mounted to the bottom plate of the lamp holder, contact members having at least four contact points with the funnel where the tension guide come into contact with the funnel of the lamp and engagement member, which is an extension of the contact members, arranged at an intermediate portion of the guide and engaged with an upper end of the front plate of the lamp holder.

8. The structure according to claim 7, wherein the tension guide further has additional contact members formed in between the engagement member and the contact member, and come in contact with the frame such that force is applied to the frame of the lamp in a downward direction to prevent the lamp from moving vertically.

9. The structure according to claim 8, wherein the additional contact members are placed symmetrical with each other.

10. The structure according to claim 8, wherein the tension guide is a shaped metal wire having an elasticity.

11. The structure according to claim 7, wherein the hinges and contact members of the tension guide are symmetrically arranged so that the contact points are symmetrically arranged in vertical and lateral directions with respect to the lamp.

12. The structure according to claim 7, wherein the contact members of the tension guide are formed in a circular shape so that they are in contact with four corners of the lamp.

13. A structure for mounting a lamp in a projector, comprising:
    a lamp support adapted to support a frame of the lamp while maintaining a desired gap from the frame; and
    return means having at least four contact points to apply an elastic force to the lamp when the lamp moves out of position, thereby returning the lamp to an original position where an optical axis of the lamp is aligned.

14. The structure according to claim 13, wherein the return means comprises:
    a shaped metal wire;
    a bottom plate included in the lamp support and adapted to support opposite ends of the metal wire; and
    a front plate of the lamp support which allows the middle section of the metal wire to be placed on the upper front of the lamp support.

15. The structure according to claim 13, wherein the return means is mounted on the lower portion of the lamp support in a manner that allows the return means to rotate.

16. The structure according to claim 13, wherein the return means comprises a shaped metal wire having a laterally symmetrical shape.

17. The structure according to claim 13, wherein the contacts are symmetrically arranged around the lamp.

18. The structure according to claim 13, wherein the contacts are symmetrically arranged in a lateral direction with respect to the lamp so that the lamp receives the same force in opposite lateral directions, respectively.

19. The structure according to claim 13, wherein the contacts are symmetrically arranged in a vertical direction with respect to the lamp so that the lamp receives the same force in opposite vertical directions, respectively.

20. A structure for mounting a lamp in a projector, comprising:
   a lamp support adapted to support a frame to the lamp while maintaining a desired gap from the frame; and
   tension guide to apply an elastic force to the lamp when the lamp moves out of position, thereby returning the lamp to an original position where an optical axis of the lamp is aligned.

21. The structure according to claim 20, wherein the tension guide has at least four contact points.

22. The structure according to claim 20, wherein the tension guide comprises:
   a shaped metal wire;
   a bottom plate included in the lamp support and adapted to support opposite ends of the metal wire; and
   a front plate of the lamp support which allows the middle section of the metal wire to be placed on the upper front of the lamp support.

23. The structure according to claim 20, wherein the tension guide is mounted on the lower portion of the lamp support in a manner that allows the return means to rotate.

24. The structure according to claim 20, wherein the tension guide comprises a shaped metal wire having a laterally symmetrical shape.

25. The structure according to claim 21, wherein the contacts are symmetrically arranged around the lamp.

26. The structure according to claim 21, wherein the contacts are symmetrically arranged in a lateral direction with respect to the lamp so that the lamp receives the same force in opposite lateral directions, respectively.

27. The structure according to claim 21, wherein the contacts are symmetrically arranged in a vertical direction with respect to the lamp so that the lamp receives the same force in opposite vertical directions, respectively.

* * * * *